Dec. 20, 1960 E. DRYDEN 2,965,416
VEHICLE SUN VISOR HAVING TWO END-FOR-END
POSITIONALLY INTERCHANGEABLE SHIELDS
Filed Aug. 29, 1958 2 Sheets-Sheet 1

INVENTOR.
EVA DRYDEN

Dec. 20, 1960 E. DRYDEN 2,965,416
VEHICLE SUN VISOR HAVING TWO END-FOR-END
POSITIONALLY INTERCHANGEABLE SHIELDS
Filed Aug. 29, 1958 2 Sheets-Sheet 2

INVENTOR.
EVA DRYDEN

United States Patent Office 2,965,416
Patented Dec. 20, 1960

2,965,416

VEHICLE SUN VISOR HAVING TWO END-FOR-END POSITIONALLY INTERCHANGEABLE SHIELDS

Eva Dryden, 11952 Cantara St., North Hollywood, Calif.

Filed Aug. 29, 1958, Ser. No. 758,028

3 Claims. (Cl. 296—97)

Generally speaking, the present invention relates to a sun visor for a vehicle and, more particularly, pertains to an improved multiple shield sun visor for a vehicle such as an automobile or the like, although not so limited, wherein a single mounting bracket is adapted to be fastened to the vehicle (usually to the front upper inside corner of the passenger-carrying body of the vehicle), and wherein a first glare shield having a first end and a second end is rotatively mounted with respect to said mounting bracket, and wherein a second glare shield having opposed ends is rotatively mounted with respect to said first glare shield with one of said ends of said second glare shield pivotally movably adjacent to said first end of said first glare shield, wherein said second glare shield may be controllably moved to another position rotatively mounting same with respect to said first glare shield with one of said ends of said second glare shield pivotally movably adjacent to said second end of said first glare shield. Thus, it can be seen that the improved multiple shield sun visor of the present invention actually comprises a vehicle sun visor having two end-for-end positionally interchangeable shields providing an arrangement which can usually be so positioned, in several different locations, as to effectively shield the eyes of a driver of an automobile or other vehicle from the sun or other source of glare in a manner incapable of attainment with customary prior art single shield sun visors for automobiles and other similar vehicles. In this connection, it should be noted that the present application is a continuation-in-part of my co-pending patent application entitled "A Multiple Shield Sun Visor for Vehicles," Serial No. 745,710, filed, June 30, 1958.

With the above points in mind, it is an object of the present invention to provide an improved double shield sun visor for vehicles including two glare shields which are rotatively mounted in an end-for-end positionally interchangeable manner.

It is a further object of the present invention to provide an improved double shield end-for-end positionally interchangeable sun visor of the type set forth in the preceding object, wherein each individual glare shield is mounted for pivotal movement around two substantially mutually perpendicular axes whereby to provide virtually any desired type and combination of glare shielding effect desired.

It is a further object of the present invention to provide a double shield sun visor wherein at least one of the shields is arranged to be end-for-end positionally interchangeable with respect to the other glare shield by means of suitable mounting means including, but not limited to, the several specific types set forth in detail hereinafter.

It is a further object of the present invention to provide a double shield sun visor for vehicles having any of the advantageous features set forth in detail in my above-identified co-pending patent application and additionally including means for rotatively mounting said first and second glare shield in a controllably end-for-end interchangeable manner whereby to eliminate the necessity for having three glare shields of the type disclosed in my above-identified co-pending patent application. Therefore, it should be understood that any of the specific features set forth in detail in said co-pending patent application may also be included in the improved double shield sun visor of the present invention set forth in this continuation-in-part application.

Other and allied objects will be apparent to those skilled in the art after a careful study of the accompanying drawings, the present specification, and the appended claims.

To facilitate understanding, reference will be made to the hereinbelow-described drawings, in which:

Fig. 1 is a perspective view showing one illustrative embodiment of the present invention in a preferred mounted position with respect to the front upper inside corner of a passenger-carrying body of an automobile (with the automobile being shown in fragmentary form only) and with the two glare shields positioned respectively in glare shielding relationship with respect to the front window of the automobile and in glare shielding relationship with respect to the right side of the field of vision of the eyes of a driver of the automobile (said driver not being shown);

Figure 3:
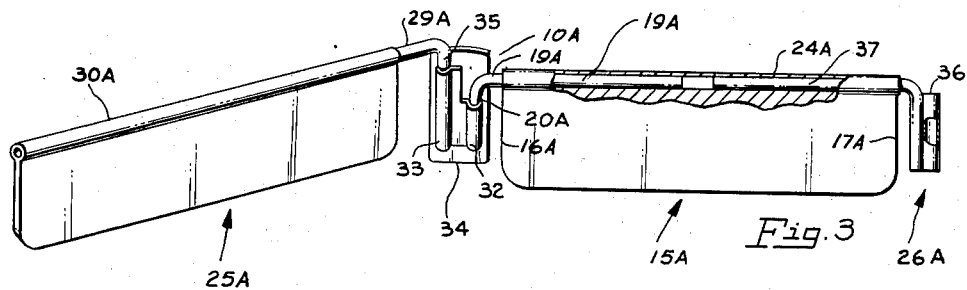
Fig. 3 is a perspective view partly broken away and partly in section showing a first slightly modified form of the invention.
Figure 4:
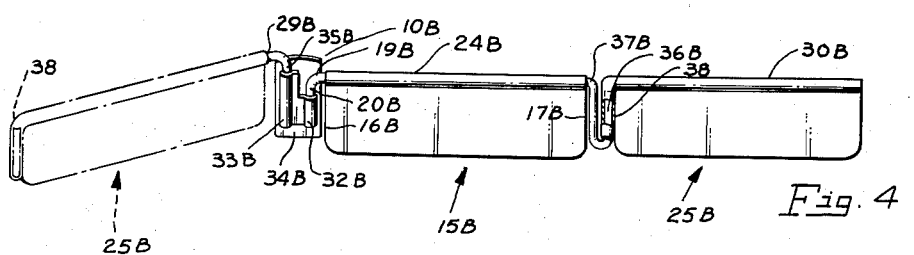
Figure 5:
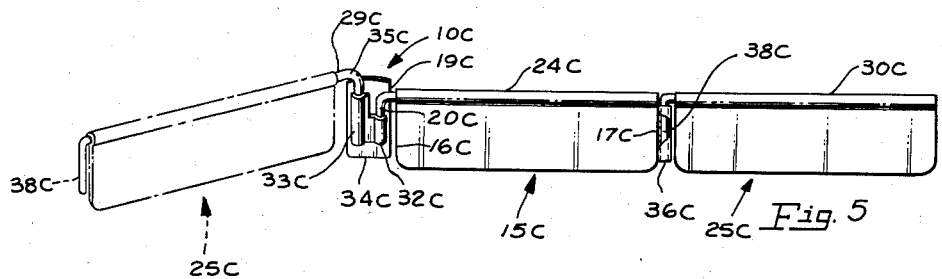

Fig. 4 is a view somewhat similar to Fig. 3 but slightly smaller in scale and showing a second slightly modified form of the invention, with the end-for-end interchangeable positions of the second glare shield being shown at the left in broken lines and at the right in solid lines; and Fig. 5 is another perspective view very similar to Fig. 4 but illustrating a third modified form of the invention, with the end-for-end interchangeable positions of the second glare shield being shown at the left in broken lines and at the right in solid lines.

The improved vehicle sun visor having two end-for-end positionally interchangeable shields of the present invention includes a mounting bracket adapted to be fastened to a vehicle. In the specific example illustrated in Figs. 1 and 2, said mounting bracket is indicated generally at 10 and is adapted to be suitably mounted and fastened to the front upper inside corner of the passenger-carrying body of an automobile in a position above the post 11 which is between the front window 12 of the automobile and the left side window 13 thereof in a position adjacent the junction of the two upper adjacent front corners of the front window 12 and the left side window 13 of the automobile body, which is indicated generally in fragmentary form at 14 in Fig. 1.

Also, the present invention includes a first glare shield, indicated generally at 15, having a first end 16 and a second end 17.

The present invention includes means for rotatively mounting said first glare shield with respect to said mounting bracket, said means being indicated generally at 18 and taking the form of a horizontal support arm 19 having an upwardly directed portion 20 rotatively received within the mounting bracket 10 and having a threaded shaft portion 21 extending upwardly therethrough and provided with a fastening nut 22 and a lock nut 23 so arranged as to fasten the upwardly directed portion 20 in controllably frictionally rotatable relationship with respect to the mounting bracket 10 so that the horizontal support arm 19 may be moved into any desired position within a horizontal plane, where it will be frictionally retained until manually repositioned. It will be noted that the glare shield 15 has an apertured top edge 24 which frictionally rotatively encompasses and longitudinally slidably encircles the support arm 19 tightly enough to provide sufficient frictional engagement therebetween to make it possible to rotatively position the glare shield 15 in any selected position around the support arm 19, where it will be frictionally retained, and also to allow the glare shield 15 to be longitudinally slidably extended or retracted along the length of the support arm 19, where it will be retained in any selected position.

Figure 1:
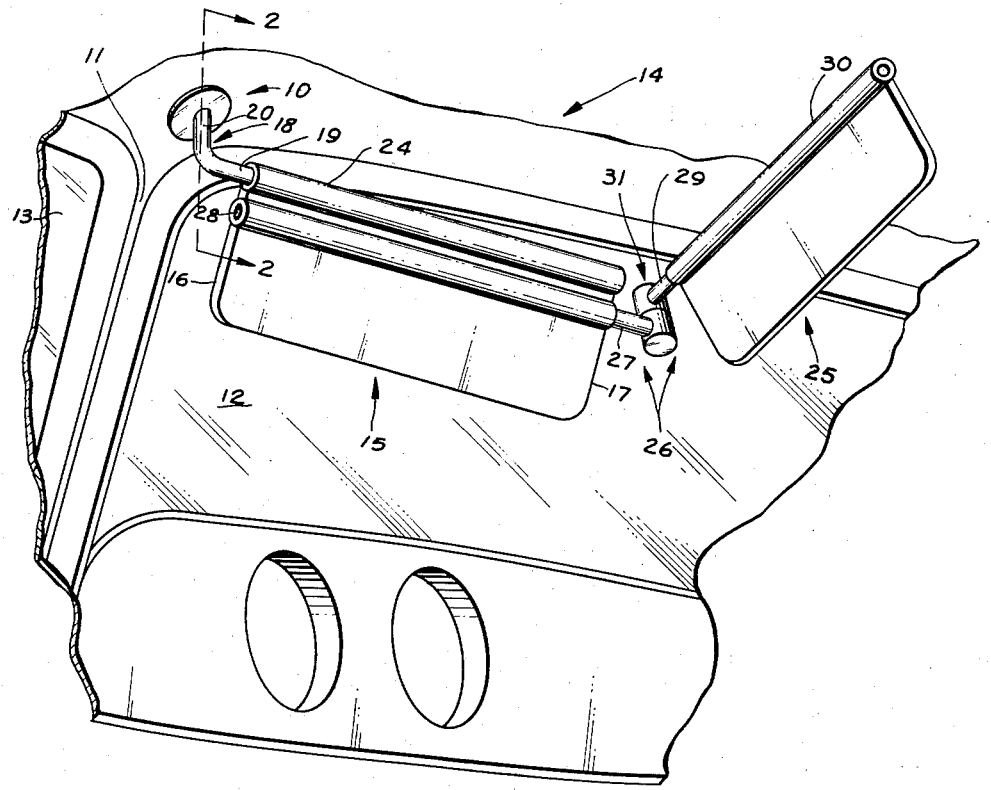
Figure 2:
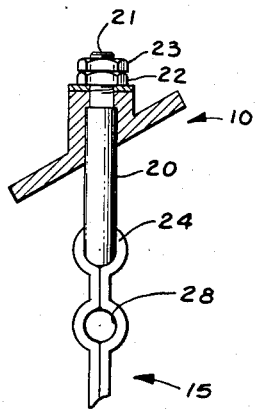
Fig. 2 is an enlarged view partly in vertical section and partly in elevation taken in the direction of the arrows 2—2 in Fig. 1 showing the mounting bracket in vertical section, and with certain portions of the device behind the plane of the section and behind the end of the first glare shield being removed for clarity.

Also, the present invention includes a second glare shield having opposed ends, and additionally includes means for rotatively mounting said second glare shield with respect to said first glare shield with one of said ends of said second glare shield pivotally movably adjacent to said first end of said first glare shield, and for alternately rotatively mounting said second glare shield with respect to said first glare shield with one of said ends of said second glare shield pivotally movably adjacent to said second end of said first glare shield. In the specific example illustrated in Fig. 1, said second glare shield is indicated generally at 25 and said mounting means is indicated generally at 26 and takes the form of a horizontal support arm 27 frictionally longitudinally slidably and rotatively received in a longitudinal aperture 28 carried by said first glare shield 15 immediately below the similarly apertured top 24 thereof, another horizontal support arm 29 frictionally longitudinally slidably and rotatively received in a longitudinal aperture in the top edge 30 of said second glare shield 25, with adjacent ends of said support arms 27 and 29 being joined together by a pivotal coupling 31 for rotation around a substantially vertical axis as viewed in Fig. 1, although it should be understood that the axis of rotation of the pivotal coupling 31 can be changed by merely rotating the horizontal support arm 27 in the frictional receiving aperture 28 in the first glare shield 15. It should be clearly understood that the engagement of the support arm 27 in the frictional receiving aperture 28 and the engagement of the horizontal support arm 29 in the frictional receiving aperture at the top 30 of the second glare shield 25 are similar to the engagement of the supporting arm 19 in the frictional receiving aperture at the top 24 of the first glare shield 15, whereby to allow frictional rotative and/or longitudinal adjustment into various desired positions which will be retained until subsequent manual repositioning. It should furthermore be understood that the entire second glare shield 25 may be moved from the right or second end 17 of the first glare shield 15, as shown in Fig. 1 to the left or first end 16 of the first glare shield 15, where the support arm 27 may be inserted into the opposite end of the receiving aperture 28 of the first glare shield 15 so as to effectively support the second glare shield 25 at the left or first end 16 of the first glare shield 15. In so doing, the pivotal coupling 31 may be turned over or adjusted into any other convenient position to allow adequate clearance thereof with respect to the horizontal support arm 19 positioned immediately thereabove. Thus, it will be seen that the shield 25 may be pivotally and adjustably mounted at either end of the shield 15 according to which direction the majority of glare is coming from.

Fig. 3 illustrates a slight modification of the present invention, and similar parts will be indicated by the same reference numerals, followed by the letter "A," however. In this modification, the mounting bracket 10A carries hinge means which consists of two vertically apertured members 32 and 33 carried by the plate 34, with said apertured members 32 and 33 being adapted to receive the downwardly bent lower ends 20A and 35, respectively, of the horizontal support arms 19A and 29A, respectively, whereby to mount each of said support arms 19A and 29A for horizontal arcuate movement, each about its own vertical pivotal axis with respect to the mounting bracket 10A. It should be noted that in this version of the present invention the second glare shield 25A is shown pivotally mounted with respect to the first end 16A of the first glare shield 15A by means of the vertically apertured member 33 and the downwardly bent portion 35 at the end of the support arm 29A. It should further be understood that the downwardly directed portion 35 may be removed from the vertically apertured portion 33 so as to allow the entire second glare shield 25A to be moved to the right end 17A of the first glare shield 15A, where the downwardly bent portion 35 may be inserted into a vertically apertured member 36 carried at the end of a support arm member 37 which is carried in the frictionally encompassing aperture within the top 24A of the first glare shield 15A in opposition to the end of the shortened horizontal support member 19A. Thus, it will be understood that with the member 35 rotatively encompassed within the vertically apertured member 36, the second glare shield 25A will be effectively rotatively mounted at the right or second end 17A of the first glare shield 15A. Thus, it can be seen that the rod 37 and the vertically apertured member 36 cooperate with the downwardly bent portion 35 to provide rotative mounting means 26A functionally equivalent to the rotative mounting means 26 shown in Fig. 1 of the first embodiment of the present invention.

Fig. 4 illustrates a second modification of the invention quite similar to the modified form of the invention illustrated in Fig. 3, and similar parts will be indicated by similar reference numerals, followed by the letter "B," however. The essential differences between this second modification of the invention and the first modification illustrated in Fig. 3, are that the short horizontal supporting arm 37B frictionally rotatively and extendably carried at the right or second end 17B of the first glare shield 15B, does not have a vertically apertured member such as that shown at 36 in Fig. 3, but rather has an upwardly directed pivot pin member 36B adapted to be received within a downwardly directed receiving aperture member 38 carried by the end of the second glare shield member 25B, whereby said apertured member 38 may be slipped over the pivot pin 36B to rotatively mount said second glare shield 25B adjacent the second end 17B of the first glare shield 15B in the manner shown in solid lines in Fig. 4; the other end-for-end interchangeable position of said second glare shield 25B being shown in broken lines at the left of Fig. 4.

Fig. 5 illustrates a third modification of the invention quite similar to the second modified form of the invention illustrated in Fig. 4, and similar parts will be indicated by similar reference numerals, followed by the letter "C," however. The essential differences between this third modification of the invention and the second modification illustrated in Fig. 4 are that the second end 17C of the first glare shield 15C carries an upwardly open vertically apertured member 36C, which is adapted to rotatively and removably receive a downwardly directed pivot pin 38C carried by the end of the second glare shield 25C, thus providing an arrangement whereby said downwardly directed vertical pivot pin 38C may be slipped downwardly into the vertically apertured member 36C to rotatively mount said second glare shield 25C adjacent the second end 17C of the first glare shield 15C in the manner shown in solid lines in Fig. 5; the other end-for-end interchangeable position of said second glare shield 25C being shown in broken lines at the left of Fig. 5.

It will be understood that in the modifications illustrated in Figs. 4 and 5, the second glare shields 25B and 25C, respectively, may be slidably removed from the support arms 29B and 29C, respectively, when said second glare shields 25B and 25C, respectively, are to be moved to the right end position shown in solid lines in Figs. 4 and 5. However, while this arrangement is illustrated, it should also be understood that the downwardly bent portions 35B and 35C, respectively, may be removed from the vertically apertured portions 33B and 33C, respectively, thus allowing the second glare shield 25B and 25C, respectively, to be moved to the right end position while still carrying the horizontal support arms 29B and 29C, respectively. Either arrangement is contemplated and is within the basic spirit and scope of the present invention.

Furthermore, it should be noted that the mounting brackets, such as are shown at 10, 10A, 10B, and 10C, are not shown provided with fastening means, since such are well known in the art and do not comprise my real invention and, furthermore, since such are fully disclosed in my above-identified co-pending patent application. Therefore, it is thought quite unnecessary to further complicate the drawings of the present application and to further lengthen the specification to describe such unimportant details, which have been previously disclosed in my co-pending patent application. This is also true in re the rotative engagement of any of the longitudinal apertures in any of the glare shields with respect to any of the support arms, since my above-identified co-pending patent application discloses the detail of this and several modified structures for controlling such frictional engagement in detail, all of which may be suitably combined with the specific disclosures of my present application and which are, therefore, thought unnecessary to again disclose in detail in my present application.

It should be noted that the mounting bracket, the rotative mounting means, the several support arms, and the pivotal coupling, disclosed herein may preferably be made of metal, but are not necessarily limited to metallic construction, but may be made of plastic or other suitable materials. Furthermore, it should be noted that the glare shields may be made of plastic, fabric, or various combinations of plastic, fabric, or other suitable materials, and may be opaque, translucent, or wholly or partially transparent, as desired.

Numerous modifications and variations of the present invention will occur to those skilled in the art after a careful study hereof. All such, properly within the basic spirit and scope of the present invention are intended to be included and comprehended herein as fully as if specifically described, illustrated, and claimed herein.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

I claim:

1. A double shield sun visor for automobiles, comprising: a mounting bracket provided with fastening means adapted to fasten said mounting bracket to the front upper inside corner of the passenger-carrying body of an automobile; a substantially horizontally directed support arm pivotally attached to said mounting bracket for horizontal arcuate pivotal movement around a vertical axis; a first substantially flat substantially rectangular glare shield having a first end and a second end and having its top edge in rotatively encompassing longitudinally slidably encircling frictional engagement with said support arm; a second substantially flat substantially rectangular glare shield; controllably engageable and disengageable means for mounting longitudinally extensibly, and rotatively said second glare shield with respect to said first glare shield with one of said ends of said second glare shield pivotally movably adjacent to said first end of said first glare shield and for alternately controllably engageably and disengageably mounting said second glare shield with respect to said first glare shield with one of said ends of said second glare shield pivotally movably adjacent to said second end of said first glare shield, said means for alternately rotatively controllably engageably and disengageably mounting said second glare shield with respect to said first glare shield including aperture-defining means carried by said first glare shield, aperture-engaging means in controllably engageable and disengageable rotative engagement with said aperture-defining means and being provided with a second longitudinal support arm carrying said second glare shield.

2. A double shield sun visor for automobiles, comprising: a mounting bracket provided with fastening means adapted to fasten said mounting bracket to the front upper inside corner of the passenger-carrying body of an automobile; a substantially horizontally directed support arm pivotally attached to said mounting bracket for horizontal arcuate pivotal movement around a vertical axis; a first substantially flat substantially rectangular glare shield having a first end and a second end and having its top edge in rotatively encompassing longitudinally slidably encircling frictional engagement with said support arm; a second substantially flat substantially rectangular glare shield; controllably engageable and disengageable means for longitudinally slidably, and rotatively mounting, about a vertical axis, said second glare shield with respect to said first glare shield with one of said ends of said second glare shield pivotally movably adjacent to said first end of said first glare shield and for alternately longitudinally extensibly and rotatively controllably engageably and disengageably mounting, about a vertical axis, said second glare shield with respect to said first glare shield with one of said ends of said second glare shield pivotally movably adjacent to said second end of said first glare shield, said means for alternately rotatively controllably engageably and disengageably mounting said second glare shield with respect to said first glare shield including longitudinal substantially horizontally directed aperture-defining means carried by said first glare shield adjacent to the first substantially horizontally directed support arm, a second longitudinal support arm carrying said second glare shield, an intermediate support arm frictionally longitudinally slidably and rotatively received in said longitudinal substantially horizontally directed aperture-defining means of said first glare shield and provided at its outer end with pivotal coupling means connecting said outer end to the inner end of said second longitudinal support arm for pivotal rotation about a vertical axis.

3. A double shield sun visor for automobiles, comprising: a mounting bracket provided with fastening means adapted to fasten said mounting bracket to the front upper inside corner of the passenger-carrying body of an automobile; a substantially horizontally directed support arm pivotally attached to said mounting bracket for horizontal arcuate pivotal movement around a vertical axis; a first substantially flat substantially rectangular glare shield having a first end and a second end and having its top edge in rotatively encompassing longitudinally slidably encircling frictional engagement with said support arm; a second substantially flat substantially rectangular glare shield; controllably engageable and disengageable means for mounting, longitudinally extensibly and rotatively about a vertical axis and about a horizontal axis, said second glare shield with respect to said first glare shield with one of said ends of said second glare shield pivotally movably adjacent to said first end of said first glare shield and for alternately rotatively controllably engageably and disengageably mounting, about a vertical axis and about a horizontal axis, said second glare shield with respect to said first glare shield with one of said ends of said second glare shield pivotally movably adjacent to said second end of said first glare shield, said means for alternately rotatively controllably engageably and disengageably mounting said second glare shield with respect to said first glare shield including longitudinal substantially horizontally directed aperture-defining frictional means carried by said first glare shield immediately below the first substantially horizontally directed support arm and extending longitudinally through said first glare shield from said first end to said second end, a second longitudinal substantially horizontally directed support arm in longitudinally slidable rotative frictional engagement within the top edge of said second glare shield, an intermediate support arm frictionally longitudinally slidably and rotatively removably and end-for-end interchangeably received in said longitudinal substantially horizontally directed aperture-defining frictional means of said first glare shield and provided at its outer end with pivotal coupling means connecting said outer end to the inner end of said second longitudinal substantially horizontally directed support arm for pivotal rotation about a vertical axis.

References Cited in the file of this patent

UNITED STATES PATENTS

| | | |
|---|---|---|
| 417,959 | Welton | Dec. 24, 1889 |
| 1,599,183 | Phillips | Sept. 7, 1926 |
| 2,260,482 | Roberts | Oct. 28, 1941 |
| 2,261,881 | Horstmann | Nov. 4, 1941 |
| 2,288,481 | Pelcher et al. | June 30, 1942 |

FOREIGN PATENTS

| | | |
|---|---|---|
| 1,132,147 | France | Oct. 29, 1956 |